(12) United States Patent
Ku

(10) Patent No.: US 9,811,224 B2
(45) Date of Patent: Nov. 7, 2017

(54) TOUCH PANEL

(71) Applicant: Samsung Display Co., Ltd., Yongin-si (KR)

(72) Inventor: Ja Seung Ku, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 41 days.

(21) Appl. No.: 14/855,869

(22) Filed: Sep. 16, 2015

(65) Prior Publication Data

US 2016/0209967 A1 Jul. 21, 2016

(30) Foreign Application Priority Data

Jan. 15, 2015 (KR) .................. 10-2015-0007626

(51) Int. Cl.
*G06F 3/047* (2006.01)
*G06F 3/044* (2006.01)

(52) U.S. Cl.
CPC .... *G06F 3/044* (2013.01); *G06F 2203/04112* (2013.01)

(58) Field of Classification Search
CPC ...................... G06F 2203/04112; G06F 3/044
USPC ......................................................... 345/174
See application file for complete search history.

(56) References Cited

U.S. PATENT DOCUMENTS

| | | | | |
|---|---|---|---|---|
| 2012/0031746 A1* | 2/2012 | Hwang | ................... | G06F 3/041 |
| | | | | 200/5 A |
| 2013/0028503 A1* | 1/2013 | Wakui | ................... | H05K 9/0086 |
| | | | | 382/141 |
| 2013/0255998 A1* | 10/2013 | Iwami | ................... | H05K 9/0094 |
| | | | | 174/250 |
| 2014/0055380 A1 | 2/2014 | Han et al. | | |
| 2014/0062902 A1 | 3/2014 | Han et al. | | |
| 2014/0198264 A1 | 7/2014 | Gao et al. | | |
| 2014/0218325 A1* | 8/2014 | Iwami | ................... | B32B 7/02 |
| | | | | 345/173 |
| 2014/0218642 A1* | 8/2014 | Iwami | ................... | G06F 3/044 |
| | | | | 349/12 |
| 2015/0177876 A1 | 6/2015 | Ishii et al. | | |
| 2016/0179259 A1* | 6/2016 | Watanabe | ................ | G06F 3/044 |
| | | | | 345/174 |

FOREIGN PATENT DOCUMENTS

| | | |
|---|---|---|
| JP | 2014-016944 | 1/2014 |
| KR | 10-2014-0010980 | 1/2014 |
| KR | 10-2014-0025922 | 3/2014 |
| KR | 10-2014-0068152 | 6/2014 |

\* cited by examiner

*Primary Examiner* — Tony Davis
(74) *Attorney, Agent, or Firm* — H.C. Park & Associates, PLC

(57) ABSTRACT

A touch panel includes a substrate, a first electrode disposed on the substrate, the first electrode including first unit electrodes disposed in a first direction and electrically connected to each other, and a second electrode disposed on the substrate, the second electrode including second unit electrodes disposed in a second direction intersecting the first direction and electrically connected to each other, in which the first unit electrodes and the second unit electrodes include a mesh pattern including irregular polygonal electrodes disposed without a gap therebetween, and the irregular polygonal electrodes include randomly selected candidate points disposed around each lattice point in a virtual regular lattice structure connected by a metal wiring.

16 Claims, 8 Drawing Sheets

TOUCH PANEL

CROSS-REFERENCE TO RELATED APPLICATION

This application claims priority from and the benefit of Korean Patent Application No. 10-2015-0007626, filed on Jan. 15, 2015, which is hereby incorporated by reference for all purposes as if fully set forth herein.

BACKGROUND

Field

Exemplary embodiments of the present invention relate to a touch panel including a mesh pattern.

Discussion of the Background

A touch sensor may recognize a touch applied by a pen or a user's finger. The touch sensor may be disposed on a display panel of an organic light emitting display device, a liquid crystal display device, and the like, and may be used as an input device of a signal to a display device. Among touch sensors, a capacitive touch sensor may measure a change in capacitance of a touched portion of the touch sensors to detect an input position of the touch.

Indium tin oxide (ITO) may be used as a material for electrodes of touch sensors, which may have a relatively high electrical resistance per unit area compared to other metal wiring. Accordingly, when electrodes of a touch panel that are formed of ITO are applied to a large screen, a considerable amount of time may be delayed from a point in time at which a touch is applied to the touch panel to a point in time at which the touched position is detected, which may degrade response performance.

A technique of forming a mesh pattern with a metal wiring formed of a metal having low electrical resistance and forming electrodes of a touch sensor using the same metal has been studied. However, when a mesh having the same shape are regularly arranged, a pattern in which pixels of a display panel are covered by the mesh form may have periodicity, which may generate moiré that may degrade visibility.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch panel configured to suppress a moiré phenomenon.

Additional aspects will be set forth in the detailed description which follows, and, in part, will be apparent from the disclosure, or may be learned by practice of the inventive concept.

According to an exemplary embodiment of the present invention, a touch panel includes a substrate, a first electrode disposed on the substrate, the first electrode including first unit electrodes disposed in a first direction and electrically connected to each other, and a second electrode disposed on the substrate, the second substrate including second unit electrodes disposed in a second direction intersecting the first direction and electrically connected to each other, in which the first unit electrodes and the second unit electrodes include a mesh pattern including irregular polygonal electrodes disposed without a gap therebetween, and the irregular polygonal electrodes include randomly selected candidate points disposed around each lattice point of a virtual regular lattice structure connected by a metal wiring.

According to an exemplary embodiment of the present invention, a method of forming a touch panel includes forming a first electrode including first unit electrodes electrically connected to each other and extending in a first direction on a substrate, forming a second electrode including second unit electrodes electrically connected to each other and extending in a second direction intersecting the first direction on the substrate, and forming a mesh pattern including irregular polygonal electrodes without a gap therebetween in the first and second electrodes, in which forming the mesh pattern includes forming virtual regular lattice structures in the first and second unit electrodes, forming candidate points around each lattice point of the virtual regular lattice structures according to a first pattern, randomly selecting at least one candidate point among the candidate points for each lattice point, and connecting the selected candidate points by a metal wiring.

According to exemplary embodiments of the present invention, mesh electrodes of a touch panel may be randomized to suppress a moiré phenomenon.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
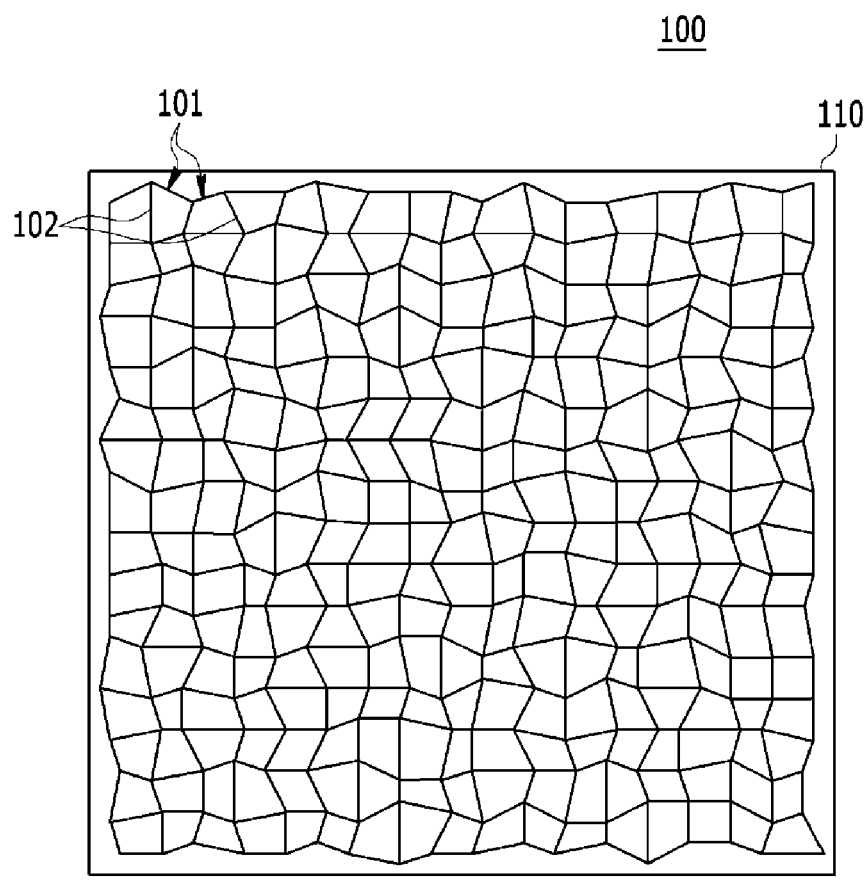
FIG. 1 is a view illustrating a conductive pattern according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

According to an exemplary embodiment of the present invention, electrodes of a touch pattern may be formed using a mesh pattern including irregular polygonal electrodes disposed without a gap. A display device coupled to a touch panel according to an exemplary embodiment of the present invention may suppress a moiré phenomenon and enhance visibility.

According to an exemplary embodiment of the present invention, irregular polygonal electrodes included in the mesh pattern may be formed by a metal wiring connecting a portion candidate points disposed around each lattice point in a virtual regular lattice structure.

Hereinafter, a touch panel according to an exemplary embodiment of the present invention will be described.

FIG. 1 is a view illustrating a conductive pattern according to an exemplary embodiment of the present invention. FIGS. 2 through 5 are views illustrating a method for forming a mesh pattern according to an exemplary embodiment of the present invention.

Referring to FIG. 1, a conductive pattern 100 according to the present exemplary embodiment includes a mesh pattern formed by metal wirings 102.

The mesh pattern that forms the conductive pattern 100 is disposed on a substrate 110 and includes irregular polygonal electrodes 101 without a gap between the polygonal electrodes 101. More particularly, the irregular polygonal electrodes 101 are coupled to each other without a gap to form the mesh pattern of the conductive pattern 100.

The irregular polygonal electrodes 101 forming the mesh pattern of the conductive pattern 100 may be formed by a line (metal wiring 102) connecting a portion of candidate points disposed around each lattice point in a virtual regular lattice structure.

Hereinafter, a method for determining a form of the mesh pattern according to the present exemplary embodiment will be described in detail with reference to FIGS. 2 to 5.

According to the present exemplary embodiment, a virtual regular lattice structure 200 may be used to form the mesh pattern included in the conductive pattern 100 of FIG. 1.

Figure 2:
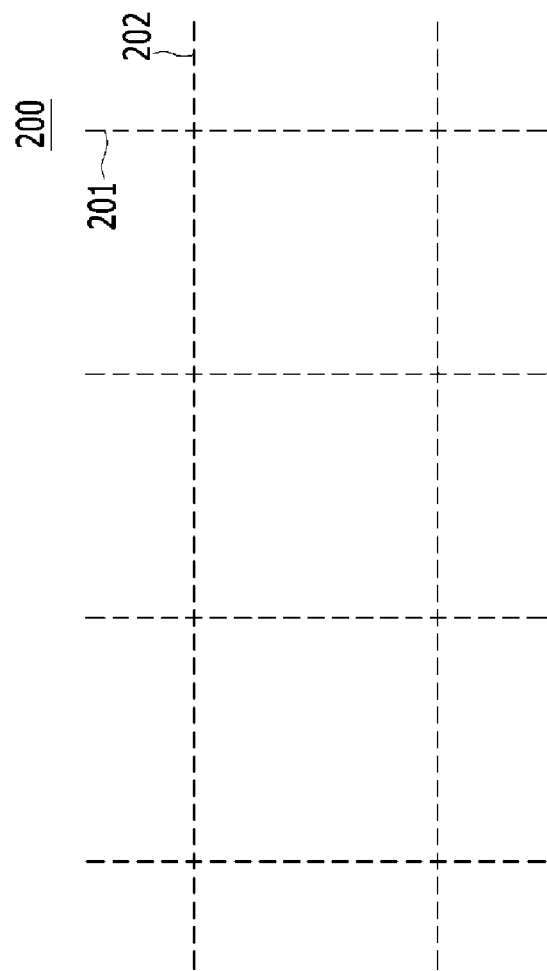
FIGS. 2, 3A, 3B, 3C, 4, and 5 are views illustrating a method for forming a mesh pattern according to an exemplary embodiment of the present invention.

Referring to FIG. 2, the virtual lattice structure 200 is formed by virtual lines 201 and 202 intersecting each other, and the virtual lattice structure 200 includes polygons having the same shape and arranged regularly. In FIG. 2, the polygons forming the virtual lattice structure may be quadrangles. Alternatively, the polygons constituting the virtual lattice structure may include polygonal electrodes having various shapes such as a triangle, pentagon, or hexagon, according to a scheme the virtual lines intersect each other.

Figure 3A:
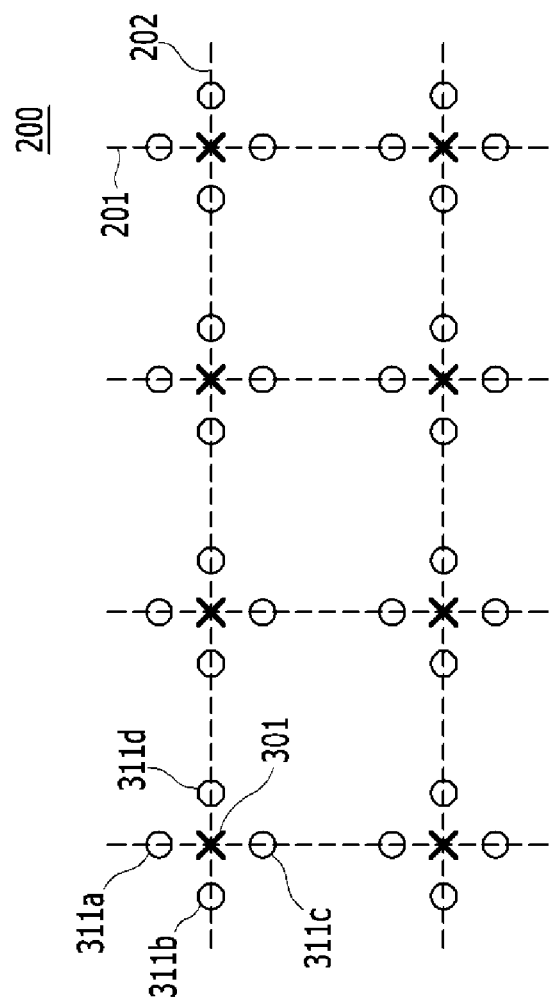
Figure 3B:
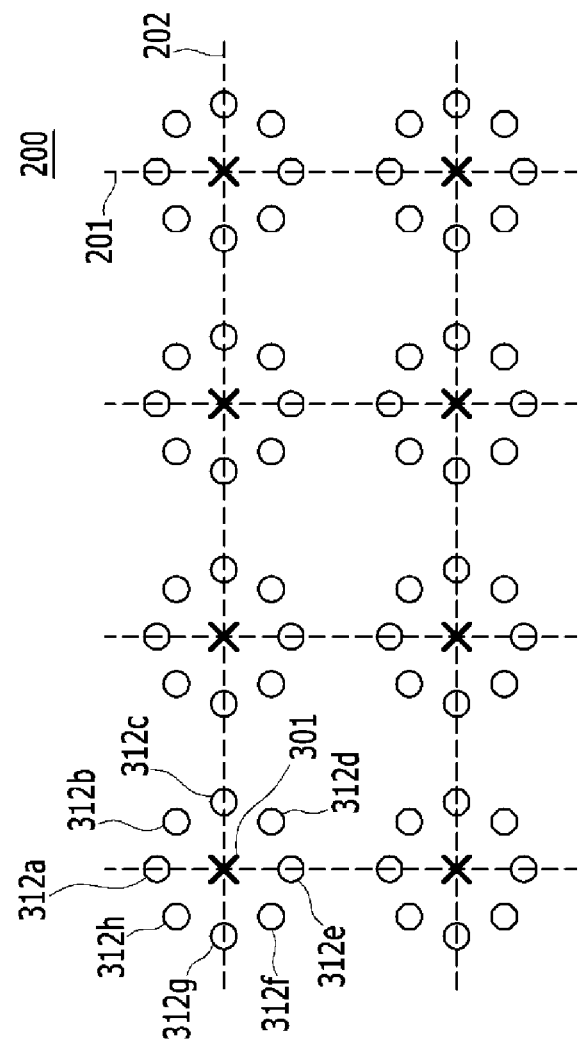
Figure 3C:
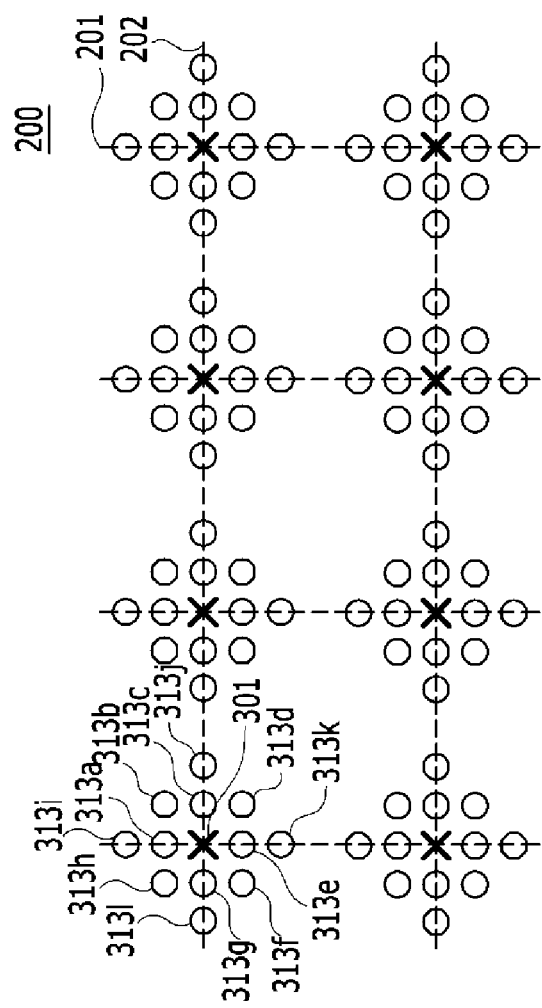

Referring to FIGS. 3A, 3B, and 3C, when the virtual lattice structure 200 is formed, candidate points are disposed with respect to each lattice point 301 in the virtual lattice structure 200. The lattice points 301 are cross points between virtual lines 201 and 202 forming the lattice structure 200. More particularly, the lattice point 301 corresponds to a vertex of a polygon having the same shape included in the virtual lattice structure 200

The candidate points are disposed in the vicinity of each lattice point 301, around each lattice point 301. A candidate point may correspond to a vertex of irregular polygons forming the mesh pattern.

The candidate points positioned in the vicinity of each lattice point 301 may be selected according to a predetermined pattern centering each lattice point 301.

According to the present exemplary embodiment, the candidate points may be points disposed in different directions from each lattice point 301.

Referring to FIG. 3A, four candidate points 311a, 311b, 311c, and 311d are spaced apart from each lattice point 301 by the same distance, and the four candidate points 311a, 311b, 311c, and 311d are disposed in different directions centering the lattice point 301. Referring to FIG. 3B, eight candidate points 312a, 312b, 312c, 312d, 312e, 312f, 312g, and 312h are spaced apart from each lattice point 301 by the same distance, and the eight candidate points 312a, 312b, 312c, 312d, 312e, 312f, 312g, and 312h are disposed in different directions centering the lattice point 301.

According to an exemplary embodiment of the present invention, the candidate points may be points at different distances and in different directions, centering each lattice point 301. Referring to FIG. 3C, twelve candidate points 313a, 313b, 313c, 313d, 313e, 313f, 313g, 313h, 313i, 313j, 313k, and 313l may be disposed at different distances and directions from each lattice point 301.

When the candidate points are set with respect to each lattice point 301, a portion of the candidate points are randomly selected as vertices of irregular polygons constituting the mesh pattern. More particularly, at least one of the candidate points disposed with respect to each lattice point 301 may be selected as a vertex of an irregular polygon.

Figure 4:
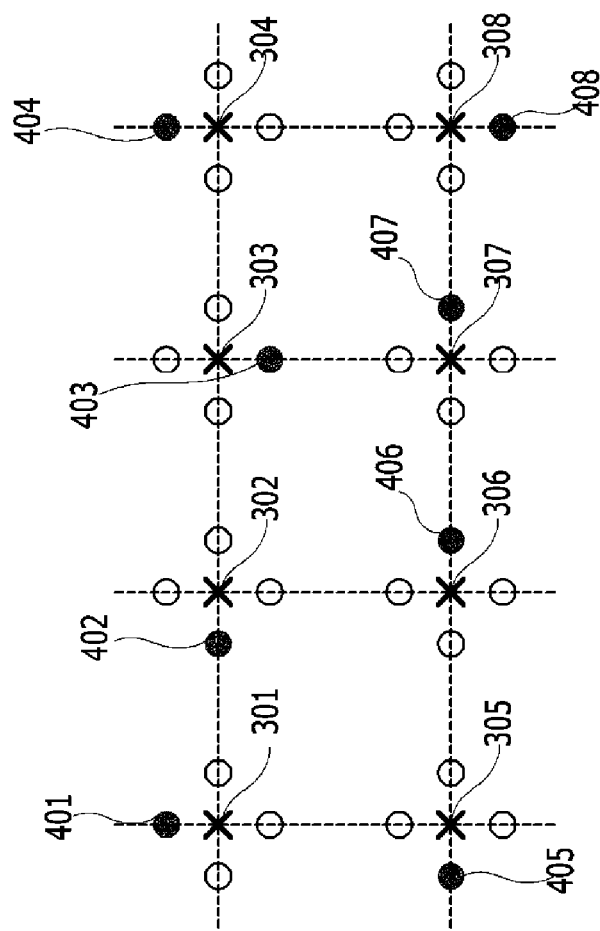

Referring to FIG. 4, each lattice points 301, 302, 303, 304, 305, 306, 307, and 308 includes four candidate points. In each lattice point 301, 302, 303, 304, 305, 306, 307, and 308, one candidate point 401, 402, 403, 404, 405, 406, 407, or 408 among the four candidate points corresponding to each lattice point 301, 302, 303, 304, 305, 306, 307, or 308 is selected as a vertex of an irregular polygon forming the mesh pattern.

Figure 5:
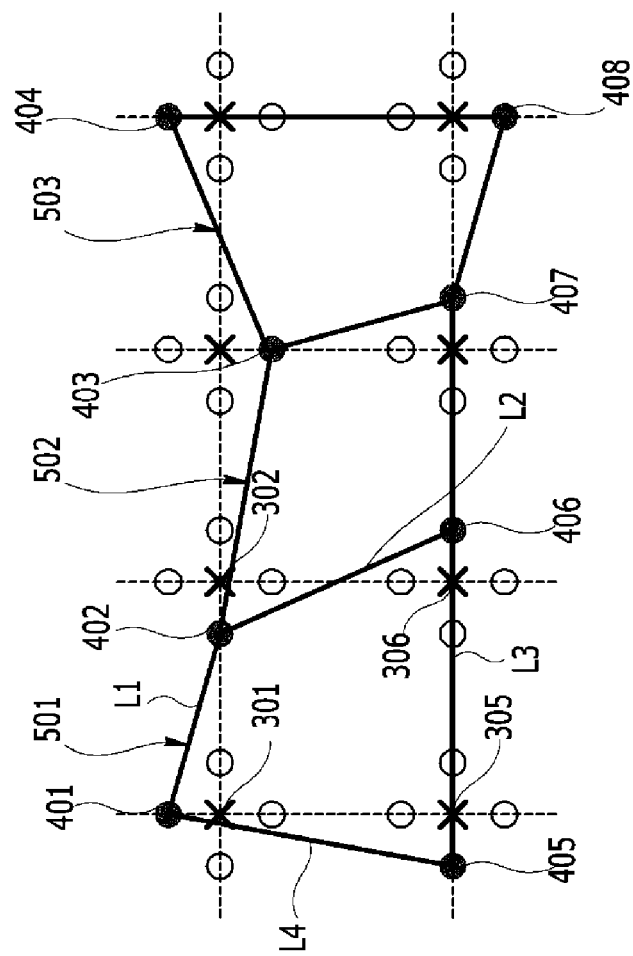

Referring to FIG. 5, when vertices of irregular polygons included in the mesh pattern are selected, neighboring vertices are connected by a metal wiring to form irregular polygons 501, 502, and 503. A vertex 401 selected as a first lattice point 301 is connected to two vertices 402 and 405 selected as second and fifth neighboring lattice points 302 and 305 by lines L1 and L5, respectively. Also, the two vertices 402 and 405 selected as the second and fifth lattice points 302 and 305 are connected to a vertex 406 selected as a sixth neighboring lattice point 306 by lines L2 and L3, respectively. Thus, an irregular quadrangle 501 including four vertices 401, 402, 405, and 406 is formed.

When the irregular polygon 501, 502, or 503 are formed by connecting a portion of candidate points disposed around each lattice point by lines in the virtual lattice structure 200, neighboring irregular polygons 501, 502, or 503 share two vertices. The neighboring irregular polygons 501, 502, or 503 also share one segment connecting two shared vertices.

Referring to FIG. 5, the first polygon 501 and the second polygon 502 neighboring the first polygon 501 share two vertices 402 and 406, and share the line L2 connecting the two vertices 402 and 406, as a segment.

Accordingly, as the neighboring polygons share the vertices and segment therebetween neighboring polygons, the irregular polygons 501, 502, and 503 are arranged without a gap in forming the mesh pattern.

When the form of the mesh pattern using the regular virtual lattice structure is determined, a metal wiring 102 having the same pattern is patterned on a substrate 110 to form the conductive pattern 100, as illustrated in FIG. 1. The conductive pattern 100 may be formed by forming irregular polygonal electrodes 101 having the same pattern as the mesh pattern without a gap. Also, each of the irregular polygonal electrodes 101 forming the conductive pattern 100 is formed by the metal wiring 102 connecting a portion of the candidate points disposed around each lattice point in the virtual regular lattice structure.

The metal wiring 102 forming the conductive pattern 100 may be formed of copper (Cu), aluminum (Al), gold (Au), silver (Ag), titanium (Ti), palladium (Pd), chromium (Cr), or a combination thereof. The metal wiring 102 may also be formed by metal silver formed by exposing and developing a silver salt emulsion layer.

The metal wiring 102 may be formed through a plating process or a deposition process using sputtering. Alternatively, the metal wiring 102 may be formed through a method of patterning a conductive metal thin film formed on a substrate through lithography or an etching method. The metal wiring 102 may also be formed through various other known methods.

The conductive pattern 100 having the irregular mesh form according to an exemplary embodiment of the present invention may be used as electrodes of a touch panel.

Figure 6:
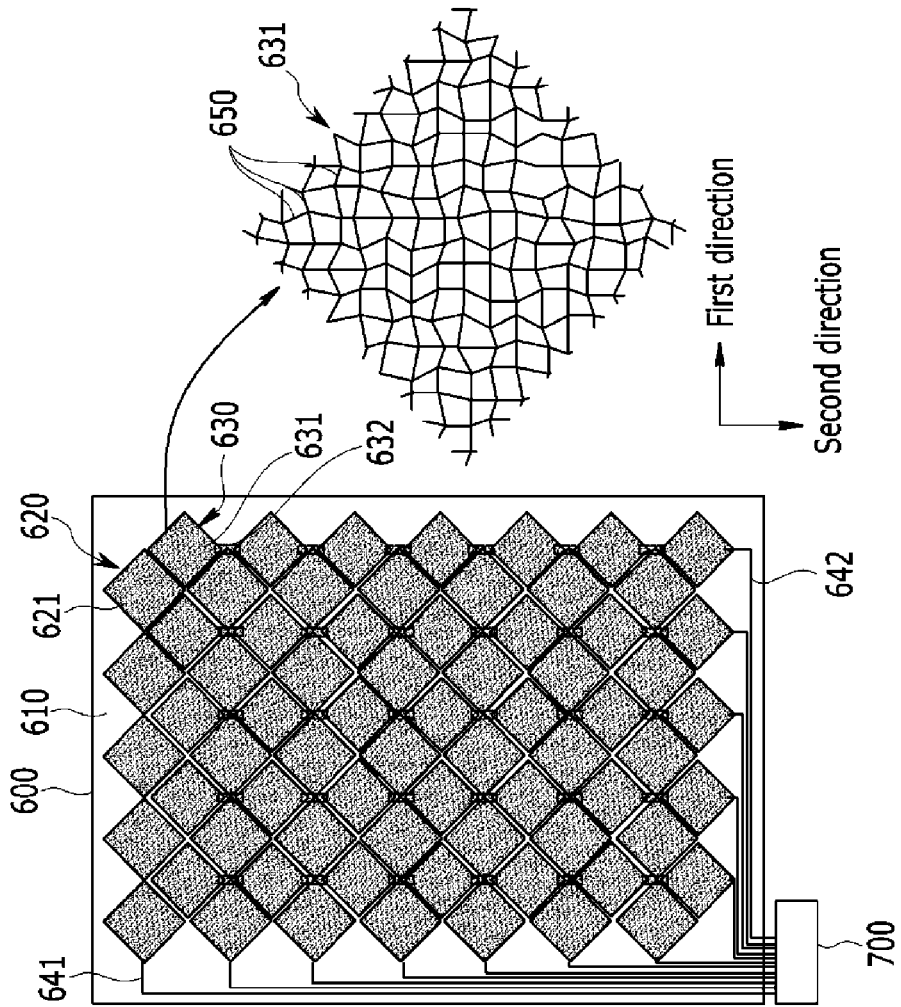
FIG. 6 is a plan view schematically illustrating a touch panel using a conductive pattern in an irregular mesh form as electrodes according to an exemplary embodiment of the present invention.

FIG. 6 is a plan view schematically illustrating a touch panel using a conductive pattern in an irregular mesh form as electrodes according to an exemplary embodiment of the present invention.

Referring to FIG. 6, according to the present exemplary embodiment, a touch panel 600 includes a substrate 610, driving electrodes 620 arranged to be conducted in a first direction on the substrate 610, and sensing electrodes 630 disposed to be conducted in a second direction on the substrate 610. Each driving electrode 620 and each sensing electrode 630 are connected to a touch controller 700 by metal wirings 641 and 642.

Each driving electrode 620 includes first unit electrodes 621 having polygonal shapes, such as a diamond shape, arranged in the first direction, and the first unit electrodes 621 are electrically connected to form a single driving electrode 620.

According to an exemplary embodiment of the present invention, the first unit electrodes 621 forming each driving electrode 620 may be formed as a conductive pattern 100 of FIG. 1 including irregular polygonal electrodes. More particularly, the first unit electrodes 621 of the driving electrode 620 are formed as the irregular polygonal electrodes 101 of FIG. 1 arranged without a gap. Each of the polygonal electrodes 101 forming the first unit electrodes 621 may be formed by a metal wiring connecting a portion of candidate points disposed around each lattice point in a virtual regular lattice structure.

Each sensing electrode 630 includes second unit electrodes 631 having polygonal shapes, such as a diamond shape, arranged in the second direction, and the second unit electrodes 631 are electrically connected to form a single sensing electrode 630.

According to an exemplary embodiment of the present invention, the second unit electrodes 631 forming each sensing electrode 630 may be formed as a conductive pattern 100 of FIG. 1 including irregular polygonal electrodes. Referring to FIG. 6, the second unit electrodes 631 of each sensing electrode 630 are formed as the irregular polygonal electrodes arranged without a gap. Each of the polygonal electrodes 650 forming the second unit electrodes 631 may be formed by a metal wiring connecting a portion of candidate points disposed around each lattice point in a virtual regular lattice structure.

According to an exemplary embodiment of the present invention, the driving electrodes and the sensing electrodes of the touch panel may be formed on the same layer. Each driving electrode (or sensing electrode) is patterned such that unit electrodes forming the corresponding driving electrode (or corresponding sensing electrode) are electrically connected to each other. Also, each sensing electrode (or driving electrode) is patterned such that unit electrodes forming the corresponding sensing electrode (or corresponding driving electrode) are physically separated from each other. An insulating layer (not shown) is formed in a connection portion, which corresponds to a cross point of the sensing electrode and the driving electrode, between the unit electrodes, in each driving electrode (or sensing electrode). A bridge electrode 632 is formed on the insulating layer to electrically connect the unit electrodes of the sensing electrodes (or driving electrodes) which are physically separated from each other, as illustrated in FIG. 6.

According to an exemplary embodiment of the present invention, the driving electrodes and the sensing electrodes of the touch panel may be formed on different layers (planes). A first layer on which the driving electrode is disposed and a second layer on which the sensing electrode is disposed are physically separated form each other. The each driving electrode and each sensing electrode are patterned such that unit electrodes forming each driving and sensing electrodes are electrically connected to each other, respectively.

In the touch panel 600 according to an exemplary embodiment of the present invention, the driving electrodes 620 and the sensing electrodes 630 arranged in different directions intersect to repeatedly form cross points, and may generate a charge coupling phenomenon to determine a user's touch position on the touch panel 600.

The touch panel 600 may be coupled or integrated to a display panel of a display device so as to operate as a user interface device in the display device.

According to an exemplary embodiment of the present invention, the electrodes of the touch panel are formed to have a mesh pattern including an array of irregular polygonal electrodes, so that periodicity from the mesh pattern covering pixels of the display device may not overlap with periodicity of black matrix patterns of color filters, to prevent a moiré phenomenon and improve visibility.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch panel, comprising:
    a substrate,
    a first electrode disposed on the substrate, the first electrode comprising first unit electrodes disposed in a first direction and electrically connected to each other; and
    a second electrode disposed on the substrate, the second electrode comprising second unit electrodes disposed in a second direction intersecting the first direction and electrically connected to each other,
    wherein:
    the first unit electrodes and the second unit electrodes comprise a mesh pattern comprising irregular polygonal electrodes disposed without a gap therebetween;
    the irregular polygonal electrodes comprise randomly selected candidate points disposed around each lattice point of a virtual regular lattice structure connected by a metal wiring; and
    each of the irregular polygonal electrodes and the virtual regular lattice structure have the same number of vertices.

2. The touch panel of claim 1, wherein:
    the candidate points are disposed around each lattice point according to a first pattern; and
    each lattice point comprises a center point around which the candidate points are disposed.

3. The touch panel of claim 2, wherein the candidate points are disposed around each lattice point in different directions with respect to the corresponding lattice point.

4. The touch panel of claim 2, wherein the candidate points are disposed around each lattice point at different distances from the corresponding lattice point.

5. The touch panel of claim 1, wherein at least one of the candidate points disposed around each lattice point is a vertex of a corresponding irregular polygonal electrode.

6. The touch panel of claim 5, wherein the irregular polygonal electrode comprises candidate points selected as vertices to correspond to two neighboring lattice points in the virtual regular lattice structure and connected by the metal wiring.

7. The touch panel of claim 5, wherein the neighboring irregular polygonal electrodes share vertices in the mesh pattern.

8. The touch panel of claim 1, wherein the metal wiring comprises at least one of copper (Cu), aluminum (Al), gold (Au), silver (Ag), titanium (Ti), palladium (Pd), chromium (Cr), and a combination thereof.

9. The touch panel of claim 1, wherein the candidate points are disposed around each lattice point at substantially the same distance from the corresponding lattice point.

10. A method of forming a touch panel, the method comprising:
    forming a mesh pattern comprising irregular polygons without a gap therebetween;
    forming a first electrode comprising first irregular polygonal electrodes corresponding to a first portion of the irregular polygons of the mesh pattern and extending in a first direction on a substrate; and
    forming a second electrode comprising second irregular polygonal electrodes corresponding to a second portion of the irregular polygons of the mesh pattern and extending in a second direction intersecting the first direction on the substrate;
    wherein forming the mesh pattern comprises:
        forming virtual regular lattice structures;
        forming candidate points around each lattice point of the virtual regular lattice structures according to a first pattern;
        randomly selecting at least one candidate point among the candidate points for each lattice point; and
        forming the irregular polygons by connecting the selected candidate points, and
    wherein each of the irregular polygonal electrodes and the virtual regular lattice structure have the same number of vertices.

11. The method of claim 10, wherein each lattice point corresponds to a vertex of an irregular polygonal electrode.

12. The method of claim 11, wherein the candidate points are disposed around each lattice point in different directions with respect to the corresponding lattice point.

13. The method of claim 12, wherein the candidate points are disposed around each lattice point at different distances from the corresponding lattice point.

14. The method of claim 12, wherein the candidate points are disposed around each lattice point at substantially the same distance from the corresponding lattice point.

15. The method of claim 10, wherein the metal wiring comprises at least one of copper (Cu), aluminum (Al), gold (Au), silver (Ag), titanium (Ti), palladium (Pd), chromium (Cr), and a combination thereof.

16. The method of claim 10, further comprising exposing and developing a silver salt emulsion layer to form the metal wiring.

* * * * *